United States Patent Office 2,980,711
Patented Apr. 18, 1961

2,980,711

6-METHYLENE-STEROIDS AND PROCESS

Frank B. Colton, Chicago, Ill., assignor to G. D. Searle & Co., Chicago, Ill., a corporation of Delaware No Drawing. Filed Apr. 28, 1960, Ser. No. 25,230

3 Claims. (Cl. 260—397.4)

The present invention is concerned with novel steroidal compounds substituted at the 6-position with a methylene radical, and with a novel process for the production thereof. These derivatives can be represented by the structural formulae

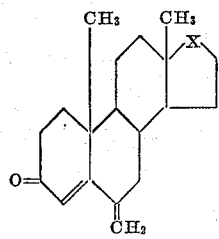

and

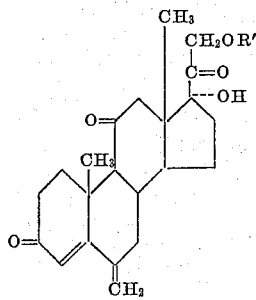

wherein X is selected from the group consisting of

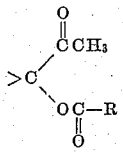

and

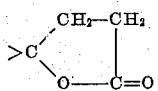

radicals, R being a lower alkyl radical; and R' is hydrogen or a lower alkanoyl radical.

The lower alkyl radicals represented by R are typified by methyl, ethyl, propyl, butyl, pentyl, hexyl, and the branched-chain isomers thereof. Examples of lower alkanoyl radicals encompassed by R' are formyl, acetyl, propionyl, butyryl, valeryl, caproyl, and the branched-chain isomers thereof.

The compounds of this invention are preferably manufactured by a novel process, involving treatment of an enol alkyl ether of the appropriate 6-methyl-4-en-3-one which manganese dioxide. This process can be illustrated using the following partial structural formulae

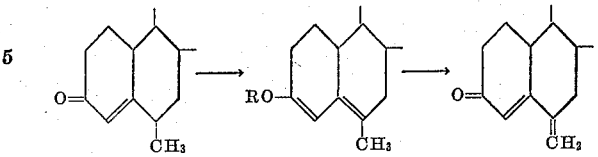

It has been determined as a further embodiment of the instant invention that manganese dioxide prepared by a special procedure is unusually active in the conduct of the herein-disclosed process. This special procedure is described below:

An aqueous solution of manganous sulfate is heated on a steam bath and an alkali metal premanganate, typically potassium permanganate, is slowly added until the presence of a small excess is made evident by that fact that a purple color persists for 15 minutes. The mixture is then filtered and the precipitate is thoroughly washed with water. The manganese dioxide formed is not washed with an organic solvent as is frequently suggested in the literature, but is rather dried at 70° for several hours.

The instant intermediate enol alkyl ethers can be prepared by methods well-known to those skilled in the art. A convenient procedure involves treatment of the appropriate 6-methyl-4-en-3-one with an alkyl orthoformate in the presence of the corresponding alkanol and an acid catalyst. By this process, for example, 17α-acetoxy-6 - methylpregn - 4 - ene - 3,20 - dione, 17α - (2 - carboxyethyl)-17β-hydroxy-6-methylandrost-4-en-3-one lactone, or 21-acetoxy-17α-hydroxy-6-methylpregn-4-ene-3,11,20-trione is treated with ethyl orthoformate and ethanol in the presence of p-toluenesulfonic acid to afford 17α-acetoxy-3 - 6 - methylpregna - 3,5 - dien - 20 - one, 17α - (2 - carboxylethyl) - 3 - ethoxy - 17β - hydroxy - 6-methylandrosta-3,5 - diene lactone, or 21 - acetoxy - 3-ethoxy-17α-hydroxy-6-methylpregna-3,5 - diene - 3,11,20-trione, respectively.

The preparation of the instant 6-methylene compounds by manganese dioxide oxidation of the aforementioned enol alkyl ethers can be conducted at temperatures of 10–60°, although the preferred operating range is room temperature, i.e. 15–30°. The reaction time can vary from 15 minutes to 2 hours. The process is preferably conducted in an inert non-polar organic solvent medium. Typical suitable solvents are benzene, toluene, xylene, methylene chloride, and carbon tetrachloride. This process is exemplified by the reaction of the aforementioned 17α - acetoxy - 3 - ethoxy - 6 - methylpregna - 3,5 - dien-20-one, 17α-(2-carboxyethyl)-3-ethoxy-17β - hydroxy - 6-methylandrosta - 3,5 - diene lactone, or 21 - acetoxy - 3 - ethoxy - 17α - hydroxy - 6 -methylpregna - 3,5 - diene-3,11,20-trione with manganese dioxide in benzene to produce 17α-acetoxy-6-methylenepregn-4 - ene - 3,20 - dione, 17α-(2-carboxyethyl)-17β-hydroxy-6-methylene androst-4-en-3-one lactone, and 21 - acetoxy - 17α - hydroxy - 6-methylenepregn-4-ene-3,11,20-trione, respectively.

The aforementioned compounds of structural formula wherein R is a lower alkyl radical, are progestational agents which lack the potent side-effects, for example, anabolic, androgenic, anti-ovulatory and neoglycogenetic, exhibited by prior art progestational compositions.

The instant compounds of structural formula

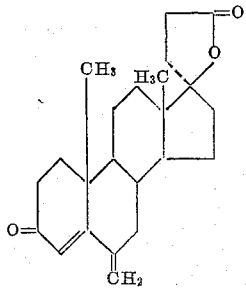

are diuretic agents as evidenced by their ability to inhibit the sodium-retaining activity of desoxycorticosterone acetate, but at the same time they lack the potent side effects, for example progestational, displayed by known diuretic substances.

The above-disclosed compounds of structural formula

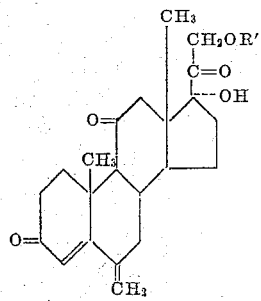

are useful as a result of their anti-inflammatory properties, and possess the advantage over prior art agents of that type in that they lack certain potent side effects, for example neoglycogenetic and eosinopenic.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

To a suspension of 3 parts of 17α-acetoxy-6α-methylpregn-4-ene-3,20-dione in 15 parts of purified anhydrous dioxane is added 2.8 parts of ethyl orthoformate, 0.8 part of ethanol and 0.034 part of p-toluenesulfonic acid monohydrate. This reaction mixture is stirred for about one and one-half hours, during which time complete solution occurs, then treated with 0.04 part of fused sodium acetate and concentrated to a small volume under nitrogen. The addition of approximately 20 parts of methanol followed by cooling to about 0° results in crystallization of the product, which is collected by filtration, washed with cold methanol, and dried to yield 17α-acetoxy-3-ethoxy-6α-methylpregna-3,5-dien-20-one, M.P. about 161–168°.

By substituting equivalent quantities of methyl orthoformate and methanol in the process of this example, 17α-acetoxy-3-methoxy-6α-methylpregna - 3,5 - dien-20-one is obtained.

*Example 2*

By submitting an equivalent quantity of 6α-methyl-17α-propionoxypregn-4-ene-3,20-dione to the processes described in Example 1, 3-ethoxy-6α-methyl-17α-propionoxypregna-3,5-dien-20-one and 3-methoxy-6α-methyl-17α-propionoxypregna-3,5-dien - 20 - one, respectively, are obtained.

*Example 3*

To a solution of one part of 17α-acetoxy-3-ethoxy-6α-methylpregna-3,5-dien-20-one in 44 parts of benzene is added 5 parts of manganese dioxide, and the resulting reaction mixture is stirred for about 40 minutes. The insoluble material is removed by filtration and washed on the filter with benzene. Concentration of the filtrate to dryness under nitrogen affords a crystalline residue. Recrystallization of this residue from methanol affords 17α-acetoxy - 6 - methylenepregn-4-ene-3,20-dione, M.P. about 248–251°. The ultravoilet absorption spectrum of this substance exhibits a maximum at about 262–263 millimicrons with an extinction coefficient of about 11,650. In the infrared, maxima are observed at about 5.76, 6.01, 6.12, 6.25, 6.91, 7.01, 7.19, 7.29, 7.38, 7.50, 7.57, 7.90, 7.98, 8.61, 8.94, 9.23, 9.50, 9.83, 10.39, 10.94, and 11.49 microns.

The instant 17α-acetoxy-6-methylenepregn-4-ene-3,20-dione can be prepared also by the substitution of an equivalent quantity of 17α-acetoxy-3-methoxy-6α-methylpregna-3,5-dien-20-one in the process of this example.

*Example 4*

By substituting an equivalent quantity of 3-ethoxy-6α-methyl-17α-propionoxypregna-3,5-dien-20-one or 3-methoxy-6α-methyl-17α-propionoxypregna - 3,5 - dien-20-one in the process of Example 3, 6-methylene-17α-propionoxypregn-4-ene-3,20-dione is obtained.

*Example 5*

The substitution of an equivalent quantity of 17α-(2-carboxyethyl)-17β-hydroxy-6-methylandrost - 4 - en-3-one lactone or 21-acetoxy-17α-hydroxy-6-methylpregn-4-ene-3,11,20-trione in the process of Example 1 results in 17α-(2-carboxyethyl)-3-ethoxy-17β-hydroxy-6-methylandrosta-3,5-diene lactone and 21-acetoxy-3-ethoxy-17α-hydroxy-6-methylpregna-3,5-diene-3,11,20-trione, respectively.

*Example 6*

By substituting an equivalent quantity of 17α-(2-carboxyethyl)-3-ethoxy-17β-hydroxy - 6 - methylandrosta-3,5-diene lactone or 21-acetoxy-3-ethoxy-17α-hydroxy-6-methylpregna-3,5-diene-3,11,20-trione in the process of Example 3, 17α-(2-carboxyethyl)-17β-hydroxy-6-methylenandrost-4-en-3-one lactone and 21-acetoxy-17α-hydroxy-6-methylenepregn-4-ene-3,11,20-trione, respectively, are obtained.

What is claimed is:

1. A compound of the structural formula

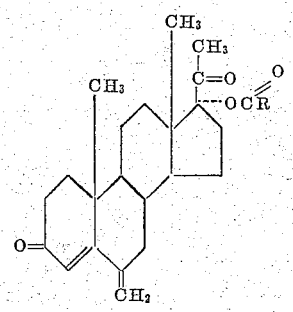

wherein R is a lower alkyl radical.

2. 17α-acetoxy-6-methylenepregn-4-ene-3,20-dione.
3. In a process for the manufacture of compounds of the structural formula
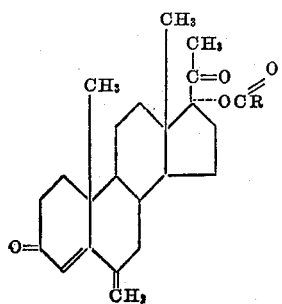
wherein R is a lower alkyl radical, the step which comprises treating a compound of the structural formula
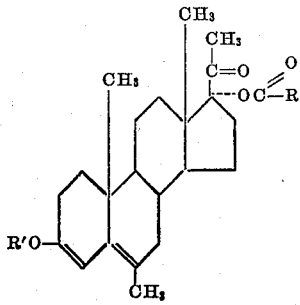
wherein R and R' are lower alkyl radicals, with manganese dioxide in an inert non-polar organic solvent.
No references cited.

UNITED STATES PATENT OFFICE
CERTIFICATE OF CORRECTION

Patent No. 2,980,711            April 18, 1961

Frank B. Colton

It is hereby certified that error appears in the above numbered patent requiring correction and that the said Letters Patent should read as corrected below.

Column 2, line 1, for "which" read -- with --; column 2, line 36, for "-acetoxy-3-6-" read -- -acetoxy-3-ethoxy-6- --; line 37, for "-(2-carboxylethyl)-" read -- -(2-carboxyethyl)- --.

Signed and sealed this 17th day of October 1961.

(SEAL)
Attest:

ERNEST W. SWIDER            DAVID L. LADD
Attesting Officer            Commissioner of Patents

USCOMM-DC